United States Patent [19]
Heitman

[11] 3,754,315
[45] Aug. 28, 1973

[54] METHOD AND MEANS FOR ATTACHING PROTECTION STRUCTURE TO A VEHICLE FRAME

[75] Inventor: Theodore A. Heitman, Libertyville, Ill.

[73] Assignee: International Harvester Company, Chicago, Ill.

[22] Filed: Feb. 24, 1972

[21] Appl. No.: 228,859

[52] U.S. Cl............ 29/400, 29/155 C, 29/200 R, 29/235, 29/451
[51] Int. Cl... B23p 17/00, B23p 19/00, B23p 19/02
[58] Field of Search.............. 29/400, 155 C, 428, 29/451, 200 R, 235

[56] References Cited
UNITED STATES PATENTS
3,123,909  3/1964  Dorst ............................. 29/155 R
3,444,609  5/1969  Neidhart et al. ................. 29/451

Primary Examiner—Thomas H. Eager
Attorney—Floyd B. Harman et al.

[57] ABSTRACT

Method and means for attaching a rollover protection structure for protecting an operator of a vehicle, said structure having four posts secured to a top plate and positioned to generally define the confines of an operator's compartment. An extension, having at least one tapered surface, is secured to each post and is receivable by a complementary socket secured to the vehicle frame. Vibration and noise dampening material is positioned between the socket and the extension and fastening means secure each extension within the corresponding socket.

8 Claims, 7 Drawing Figures

Patented Aug. 28, 1973  3,754,315

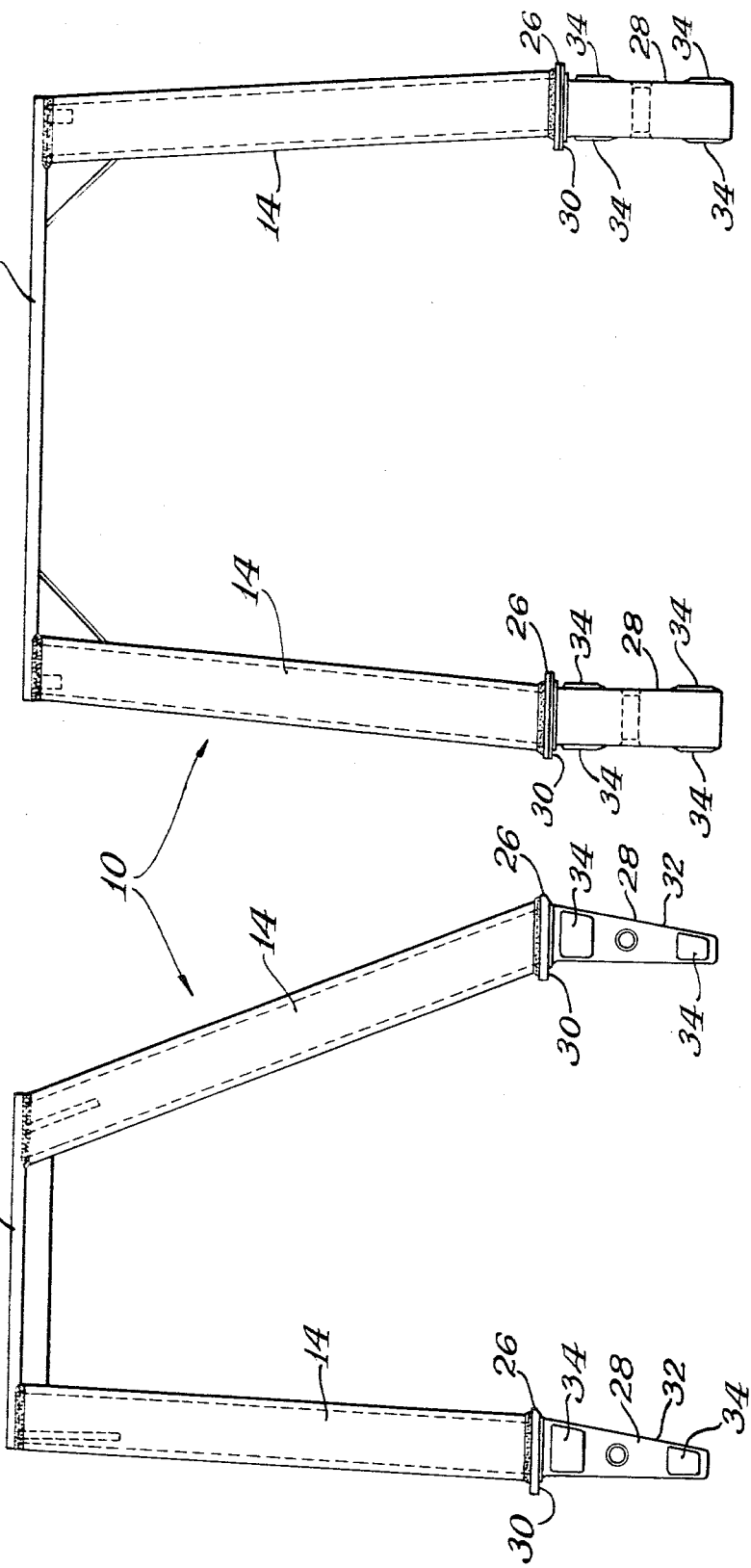

Patented Aug. 28, 1973 3,754,315

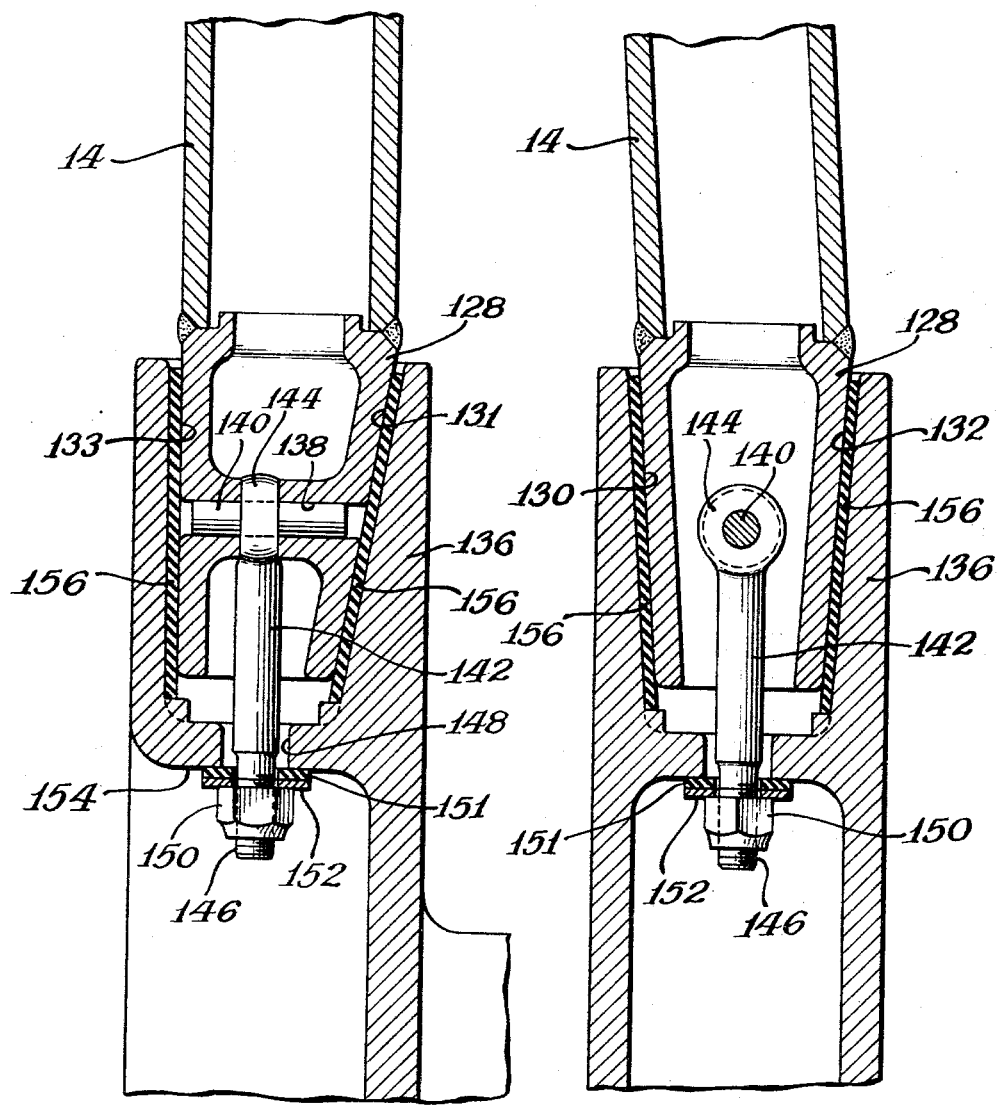

3,754,315

METHOD AND MEANS FOR ATTACHING PROTECTION STRUCTURE TO A VEHICLE FRAME

BACKGROUND AND SUMMARY OF THE INVENTION

The prior art is replete with rollover protection structures which are capable of providing a zone of safety for a vehicle operator in the event the vehicle should upset. Generally, such structures are of the multiple post type in which the posts are welded or otherwise secured to a top plate and arranged to define a compartment for the operator. Frequently, it is desirable or necessary, especially in large construction equipment, to build the rollover protection structure separately from and independently of the vehicle and then mount or attach this structure to devices built into the vehicle during its construction. The normal manufacturing tolerances encountered in building the vehicle, with its attaching devices, and the protection structure separately often render it difficult, and in some cases impossible, to subsequently effect a suitable connection between the vehicle and the rollover protection structure. Since the rollover protection structure defines the operator's compartment, and in some cases carries with it, or has attached to it, means for providing an enclosed cab for the operator, it is also desirable to eliminate or minimize the transmission of vibrations and noises from the main vehicle chassis to the protection structure.

It is therefore an object of this invention to provide a rollover protection structure having means for attaching the structure to the vehicle frame, which means is capable of compensating for manufacturing tolerances and dimensional variations, and which is capable of isolating the rollover protection structure from vibration and noises created in or carried by the vehicle frame.

It is also an object of this invention to provide a rollover protection structure which is capable of being mounted on a vehicle at a level and uniform elevation and despite dimentional variations introduced due to manufacturing tolerances.

It is a further object of this invention to provide a means for mounting a rollover protection structure on a vehicle, which means compensates for manufacturing tolerances introduced in the construction of the rollover protection structure and the vehicle frame, and which is capable of isolating the rollover protection structure from noise and vibration.

It is also an object of this invention to provide a method of attaching a rollover protection structure to a vehicle.

These and other objects, and many of the attendant advantages thereof, will become more readily apparent from a perusal of the following description and the accompanying drawings, wherein:

FIG. 2 is a side elevational view of the rollover protection structure shown in FIG. 1;

FIG. 3 is an elevational view of the structure in FIG. 2 as viewed from the left;

FIG. 6 is a detail view of another embodiment of a mounting means according to the present invention; and FIG. 7 is an elevational view of the device of FIG. 6 taken on line 7—7.

DESCRIPTION OF PREFERRED EMBODIMENTS

Figure 1:
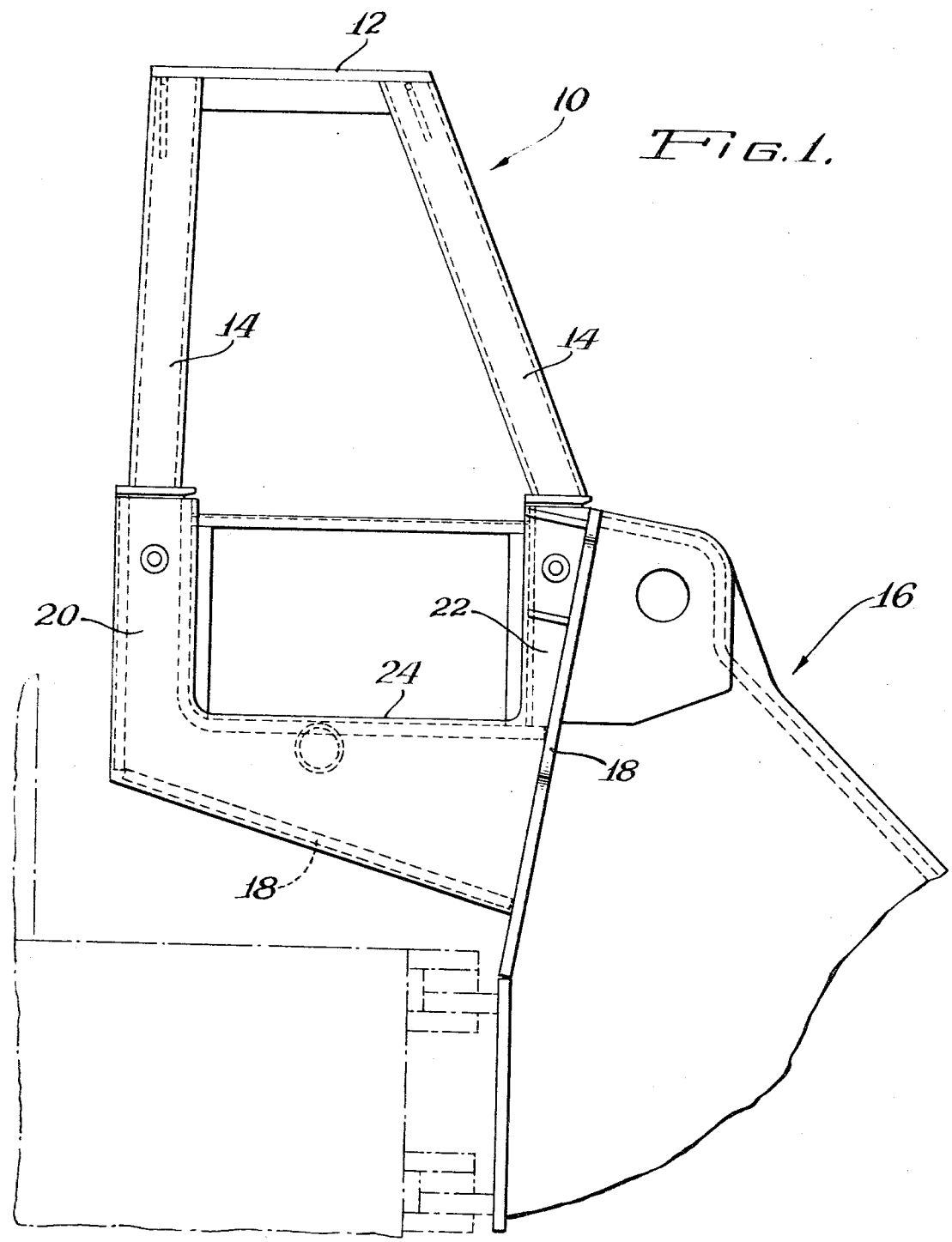
FIG. 1 is a side elevational view of a portion of a vehicle frame with a rollover protection structure according to the present invention.
Figure 4:
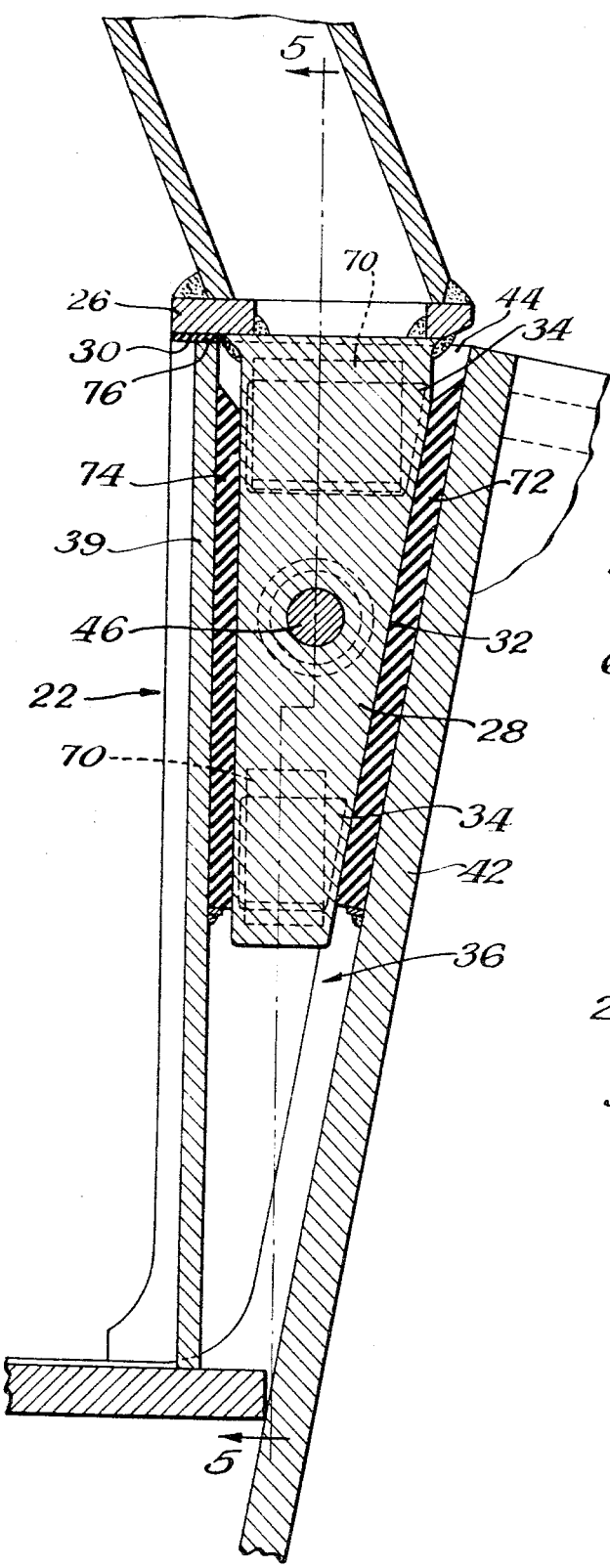
FIG. 4 is a detail view of one of the attaching means for the rollover protection structure, as shown in FIG. 1.
Figure 5:
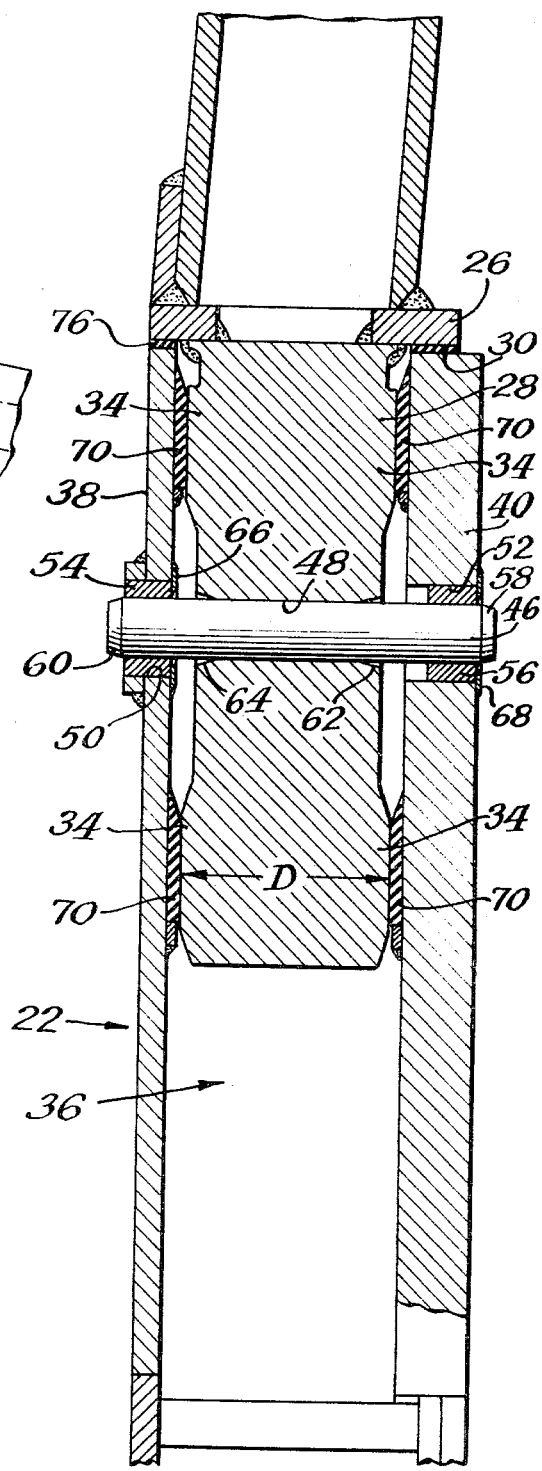
FIG. 5 is a cross sectional view taken on line 5—5 of FIG. 4.

Referring now to the drawings, there is shown in FIG. 1 a rollover protection structure, indicated generally at 10, which consists basically of a top plate 12 to which a plurality of supports or posts 14 are attached. The supports 14 generally define a portion of the operator's compartment. In the particular illustration of FIG. 1, the vehicle 16 is provided with a frame member 18 having integrally formed upstanding legs 20 and 22. Hence in the particular embodiment illustrated in FIG. 1, the supports 14 define approximately the upper two-thirds of the operator's compartment while the legs 20 and 22 define the lower third of the operator's compartment with the floor of the compartment being located at 24.

As more clearly shown in FIGS. 2 through 5, a plate 26 is secured to the lower end of each of the posts 14. An extension 28 projects downwardly from each of the plates 26 and is secured thereto. The plate 26 extends beyond the peripheral dimensions of the post 14 and the extension 28 to form a flange or shoulder 30 extending therearound between the lower end of the post 14 and the top of the extension 28. The purpose of this flange will be explained more fully hereinafter.

Each of the sockets 28 is provided with three substantially vertical faces and one inclined face 32. Because of the inclined face 32, the extension 28 is smaller in one dimension at its lower end than at its upper end, as will be apparent from a comparison of FIGS. 4 and 5. The two faces of the extension 28 which are adjacent the inclined face 32 are machined to hold the transverse distance D to a given dimension within a relatively small range of tolerance. Hence the extension 28 will have a dimension in one direction which is held to relatively close tolerances irrespective of the dimensional variations introduced in manufacture of the frame 10 and the vehicle chassis 16, and a tapered surface, due to the inclined face 32, transverse to the direction of the dimension held to close tolerances. In order to minimize the amount of machining necessary to determine the dimension D, it may be desirable to provide pads or protrusions 34 at selected positions on the faces of the extension 28 adjacent to the inclined face 32.

Each of the extensions 28 is received within a socket indicated generally at 36 formed in the upstanding legs 20 and 22. This socket 36 is formed by three vertical walls 38, 39 and 40, with the fourth wall 42 being oriented and inclined to be complementary with the inclined face 32 of the extension 28. The upper end 44 of the socket 36 therefore presents a much wider opening to receive the small lower end of the extension 28. It is to be noted that all of the extensions 28 are affixed to the lower ends of the post 14 so that the inclined faces 32 are oriented to face in the same direction. As a result, all of the machined dimensioned D will also be oriented to extend in the same direction, i.e., transverse to the inclined face 32.

Each of the extensions 28 is secured within the socket 36 by means of a pin 46. A bore 48 is provided in the extension 28 extending through the machined faces thereof. The vertical walls 38 and 40 of the socket 36 are provided with aligned bores 50 and 52 respectively. The bores 50 and 52 are considerably larger than the diameter of the pin 46 and accept resilient washers 54 and 56 respectively, each washer of which has an opening substantially the same as the diameter of the pin 46. The resilient washers 54 and 56 serve two functions. They permit compensation for slight angular variations between the center line of the bore 48 and the center line of the aligned bores 50 and 52, as well as dimensional variations affecting the vertical elevation of the bore 48 relative to the center lines of the bores 50 and 52, and serve to isolate the extension 28, and hence the frame 10, from vibrations induced in or carried by the walls 38 and 40. In order to facilitate ease of assembly, the ends of the pin 46 are chamfered, as at 58 and 60 and each end of the bore 48 is tapered as at 62 and 64. Hence, the insertion of the pin 46 through the bore 48 is facilitated even though the center line of the bore 48 is initially out of alignment with the bores 50 and 52. Any misalignment is compensated for by distortion of the resilient washers 54 and 56. To prevent the washers 54 and 56 from being pushed from their position within the bores 50 and 52 during insertion of the pin 48, it is desirable to affix metal washers 66 and 68, to the walls 38 and 40 on the side thereof opposite the side through which the pin 46 is first inserted. While it is apparent, that only one end of the pin 46 need be chamfered, and only one end of the bore 48 need be chamfered, providing the appropriate chamfer or bore on either end of the respective pin 46 and bore 48 permits any of the extensions 28 to be utilized on any one of the posts 14 and either end of the pin 46 to be inserted first into the bore 48.

In order to complete the isolation of the post 14 from the socket 36 to minimize the transmission of noise and vibration therebetween, resilient pads 70 are positioned between the walls 38 and 40 and the machined surfaces of the extension 28. Similarly pads 72 and 74 are positioned between the wall 42 and the inclined face 32 and between the opposite face of the extension 28 and the wall 39. To complete the isolation, a resilient pad 76 is positioned between the top of the walls 38, 39 and 40 and the shoulder 30.

In actual practice, due to the normally encountered manufacturing variations, it will be necessary to support the previously completed frame 10 above the vehicle chassis 16 with the extensions 28 in position within the sockets 36. While holding the frame 10 in this position, so that the top plate is level and at the desired elevation, a workman would then select from a plurality of elastomeric pads of various thickness, ones which will fit tightly between each face of the extension and the corresponding side wall of the socket. Having selected the proper thickness for the pads 70, 72, 74 and 76, the structure 10 would be removed and the selected ones of the pads would be secured to the interior walls of the sockets. Once the pads are properly secured, such as by adhesive, for example, the frame 10 is repositioned on the vehicle structure with the extensions resting in the corresponding sockets and the pins 46 are inserted through the bores 48. The pins 46 are retained in their position by making the diameter of the opening in the resilient washers 56 slightly smaller than the diameter of the pin 46 so that the pins are frictionally grasped by the resilient washers 56 and 56.

DESCRIPTION OF A SECOND EMBODIMENT

FIGS. 6, 7 and 8 illustrate another embodiment of the present invention wherein the extensions 128 are directly secured, such as by welding, for example, to the post 14. The extension 128 is provided with three inclined faces 130, 131 and 132 and one substantially vertical face 133. The socket 136 has three inclined walls which are complementary to the inclined surfaces 130, 131 and 132 and a substantially vertical wall complementary to the vertical face 133. Extension 128 is provided with a bore 138 extending between the vertical face 133 and the opposite inclined face 131. A pin 140 is acceptable within the bore 138, The interior of the socket 128 is hollowed to permit a toggle bolt 142, having an eye 144 at one end and a threaded portion 146 at the other end. The pin 140 passes through the eye 144 and pivotally secures the toggle bolt 142 to the extension 128. The toggle bolt extends through an opening 148 in the bottom of the socket 136. A nut 150 threadedly engages the threaded portion 146 of the toggle bolt 142. Washers 151 and 152 are positioned between the nut 150 and the lower surface 154 of the socket 136, with washer 152 being metal and washer 151 resilient. By tightening the nut 150 on the threaded portion 146, the extension 128 will be retained in position within the socket 136. Resilient pads 156 are provided between each of the faces 130, 131, 132, and 133 and the corresponding walls of the socket 136. The structure of this embodiment provides the desired compensation for dimensional variations by providing a tapered surface in two transverse directions, eliminates the need for machining the extension 128, and isolates the post 14 from vibrations induced in or carried by the vehicle frame. Assembly of the device is facilitated by pivotally mounting the toggle bolt 148 to the extension prior to insertion of the extension 128 in the socket 136. The pin 140 can readily be inserted through the bore 138 and the eye 144 of the toggle since this operation will be performed remote from the socket 136. The pivotal mounting of the toggle bolt 142, and the relatively large size of the opening 148 relative to the diameter of the toggle bolt 142 readily permits the insertion of the threaded portion 146 through the opening 148 as the extension 128 is lowered into the socket 136. The threading of the nut 150 on the threaded portion 146 can readily be accomplished irrespective of any dimensional variations or angular misalignments of the various components. The selection of the thicknesses for the resilient pads 156 is accomplished in the same manner as described in connection with the previously described embodiment.

While two embodiments of the present invention have been disclosed herein, it is to be understood that various changes and modifications may be made without departing from the spirit of the invention as defined by the scope of the appended claims.

What is claimed is:

1. A method of attaching a roll over protecting structure to a vehicle having a frame including a plurality of sockets, the structure including a plurality of posts having extensions on their lower ends complementary to the sockets, comprising the steps of:
   supporting the structure above the frame with each extension within its corresponding socket;
   selecting from a plurality of elastomeric pads of various thickness one which will fit tightly between each face of each extension and its corresponding socket;

removing said structure;

securing said selected pads to the interior walls of the sockets;

repositioning said structure on the frame with said extension resting in the corresponding socket; and securing each extension to the frame.

2. A method of attaching a roll over protection structure to a vehicle having a frame including a plurality of sockets, the structure including a plurality of posts having extensions on their lower ends complementary to the sockets, comprising the steps of:

machining two opposite faces of each extension so that the distance between said faces is held to a close tolerance;

securing each extension to one of the posts;

supporting the structure above the frame with each extension within its corresponding socket;

selecting from a plurality of elastomeric pads of various thickness one which will fit tightly between each face of each extension and its corresponding socket;

removing said structure;

securing said selected pads to the interior walls of the socket;

repositioning said structure on the frame with each extension resting in the corresponding socket; and securing each extension to the frame.

3. A method of attaching a roll over protection structure to a vehicle having a frame including a plurality of sockets, each socket having one inclined wall, the structure including a plurality of posts, comprising the steps of;

providing a plurality of extensions equal to the number of sockets;

forming an inclined face on each extension complementary to the inclined wall of each socket;

machining two opposite parallel faces of each extension so that the distance therebetween is held to a close tolerance;

securing each extension to one of the posts;

supporting the structure above the frame with each extension within its corresponding socket;

selecting from a plurality of elastomeric pads of various thickness one which will fit between each face of each extension and its corresponding socket;

removing said structure;

securing said selected pads to the sockets;

repositioning said structure on the frame with each extension resting on the pads in the corresponding socket; and pinning each extension to the frame.

4. A method according to claim 3, and further comprising the steps of:

providing an opening through said parallel faces on each extension;

providing corresponding openings through the side walls of each socket;

securing elastomeric washers around said corresponding openings; and inserting a pin through both said openings.

5. A means for attaching a roll-over protection structure to the frame of a vehicle, said means comprising:

an extension secured to said structure;

said extension having an inclined face and adjacent faces spaced apart a given distance within a close range of tolerance;

a socket formed in said frame and having an inclined wall complementary to said inclined face;

said socket being capable of accepting said extension;

means for securing said extension on said socket; and resilient pads positioned between said socket and said extension to isolate said extension from vibrations in said frame.

6. The invention according to claim 5, wherein said securing means comprises:

a bore in said extension between said spaced faces;

resilient washers secured in said socket; and pin means extending through said washers and said bore.

7. A means for attaching a roll-over protection structure to the frame of a vehicle, said means comprising:

an extension secured to said structure;

said extension having a tapered shape in two transverse directions;

a socket on said frame having a shape complementary to said extension;

means securing said extension in said socket;

and resilient pads between said extension and said socket.

8. The invention according to claim 7, wherein said securing means comprises:

a toggle bolt secured to said extension and projecting beyond said extension and through said frame; and a nut engageable with the toggle bolt from drawing said extension into said socket upon tightening thereof.

* * * * *